United States Patent [19]

Balkwill et al.

[11] 4,408,695
[45] Oct. 11, 1983

[54] AIR AND MOISTURE RESISTANT COVER WITH ELECTRICAL BOX HAVING FASTENING FLANGE

[76] Inventors: G. Russell Balkwill, 2429 Howard Ave., Windsor, Ontario, Canada, N8X 3Y5; Jules P. Robinet, 2865 Virginia Park, Windsor, Ontario, Canada, N9E 2B8; John F. Tamasovics, 2530 Todd La., Windsor, Ontario, Canada, N9H 1K5

[21] Appl. No.: 362,144

[22] Filed: Mar. 26, 1982

Related U.S. Application Data

[63] Continuation-in-part of Ser. No. 176,571, Aug. 4, 1980, Pat. No. 4,345,693, which is a continuation of Ser. No. 36,436, May 7, 1979, abandoned, which is a continuation of Ser. No. 908,223, May 22, 1978, Pat. No. 4,158,420.

[51] Int. Cl.³ .............................................. H02G 3/08
[52] U.S. Cl. ..................................... 220/3.3; 220/3.8; 220/3.92; 220/3.94; 174/57
[58] Field of Search .................... 174/57; 52/220, 221; 220/3.2, 3.3, 3.4, 3.8, 3.92, 3.5, 3.6, 3.94

[56] References Cited

U.S. PATENT DOCUMENTS 4,296,870 10/1981 Balkwill et al. ...................... 220/3.3
4,345,693 8/1982 Balkwill et al. ...................... 220/3.3

Primary Examiner—Joseph Man-Fu Moy
Attorney, Agent, or Firm—Allen D. Gutchess, Jr.

[57] ABSTRACT

A cover is provided for an electrical box with a fastening flange, particularly when the box is installed in an outside wall or ceiling, back of which is a cooler space. The cover extends around all of the electrical box except the open face, with the fastening flange extending through the cover in an air and moisture tight relationship. The cover has a slanted, thin-wall flange which contacts and seals against the back surface of the wall or ceiling panel in which the box is mounted. The cover prevents cold air from entering the building through or around the box and heated air from escaping from the interior of the building. The cover also prevents water or moisture from entering the box from the outside. The electrical box and the cover are handled and installed as one unit to minimize extra labor. Preferably, the cover is molded on the box with portions spaced from the box where knockout plugs for wires are located.

11 Claims, 5 Drawing Figures

AIR AND MOISTURE RESISTANT COVER WITH ELECTRICAL BOX HAVING FASTENING FLANGE

This application is a continuation-in-part of our co-pending application Ser. No. 176,571, filed on Aug. 4, 1980, now U.S. Pat. No. 4,345,693 which is a continuation of application Ser. No. 36,436 filed on May 7, 1979, now abandoned, which is a continuation of our earlier application Ser. No. 908,223, filed on May 22, 1978, now U.S. Pat. No. 4,158,420.

This invention relates to a cover and an electrical box with a fastening flange, which cover prevents cold air from entering and heated air from escaping through and around the box, and also prevents water and moisture from entering through and around the box.

Heretofore, electrical boxes have been simply installed in alignment with an opening in a wall or ceiling, with the box fastened to a stud. In such instances, cold air can enter the building through the various openings in the electrical box and through the opening in the wall or ceiling around the box. Also, heated air can escape in the opposite direction. In addition, water or moisture can enter the box from the outside and can cause short circuits in the box.

The present invention provides a cover for an electrical box having a fastening flange extending outwardly therefrom to be fastened to a structural member in the wall or ceiling. The cover extends completely around the side walls and the back wall of the box and has a flexible, thin-wall flange slanting away from the cover so that the peripheral edge of the flange can tightly contact the back surface of the wall or ceiling panel in which the box is mounted. In this manner, air and water or moisture are prevented from entering through the box itself and also around the box through the opening in the wall or ceiling in which the box is mounted. Similarly, heated air is prevented from escaping.

The fastening flange of the electrical box extends through the cover, in sealing relationship therewith, with the cover being molded directly around the box and handled and installed as a unit or assembly. The cover is in contiguous relationship with substantial portions of the box but is preferably spaced therefrom at locations of knockout plugs in the box for wires. A suitable tool can then be used by the electrician to penetrate the cover near the knockout plug, and engage and remove the knockout plug, leaving an opening in the electrical box to receive a wire. The wire can then be pushed through the small opening in the cover made by the tool and then inserted through the box opening and into the box. The wire thereby achieves a tight fit with the cover which resists flow of air and the passage of moisture. With the cover molded on the box with the fastening flange extending therethrough, a sealed fit is also achieved between the cover and the fastening flange to again prevent flow of air or the passage of moisture between the box and the flange.

With this arrangement, the electrical box and the cover are sold, handled, and installed as an assembly or unit. This minimizes and substantially eliminates any excess labor otherwise required when a separate cover is employed. The fastening flange is also affixed directly to a stud or other structural member so that no fasteners penetrate the air and moisture resistant cover.

It is, therefore, a principal object of the invention to provide an improved air and moisture resistant cover for electrical boxes with fastening flanges, to prevent the passage of air and moisture through and around the box.

Another object of the invention is to provide an electrical box with a fastening flange and with a cover molded on the box with the fastening flange extending therethrough to enable the box and cover to be handled and installed as a unit and to enable the flange to be attached to a structural member independently of the cover.

Yet another object of the invention is to provide an electrical box with knockout plugs for wires and with a cover molded on the box but spaced from the box in the locations of the knockout plugs, whereby the knockout plugs can be removed from outside the cover.

Many other objects and advantages of the invention will be apparent from the following detailed description of a preferred embodiment thereof, reference being made to the accompanying drawings, in which.

Figure 1:
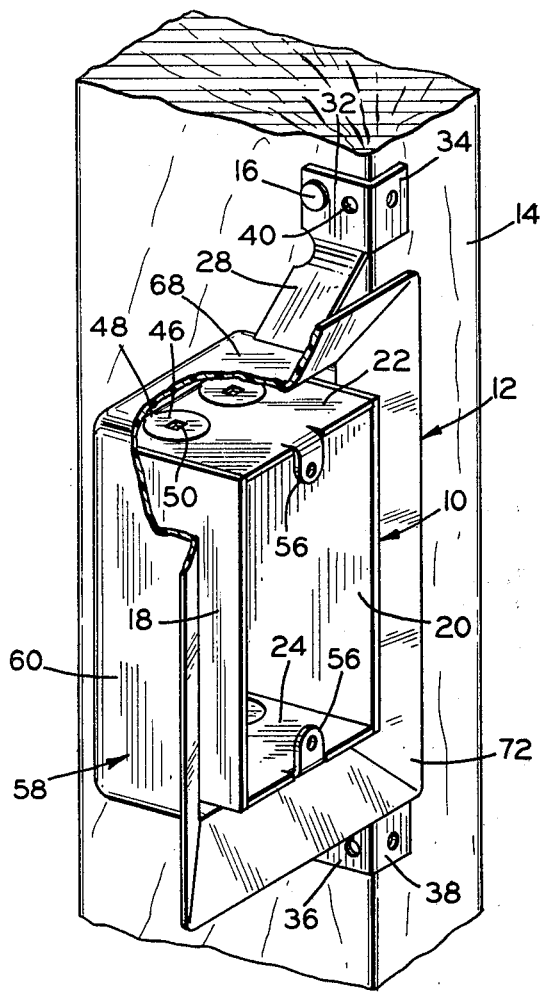
FIG. 1 is a view in perspective of an electrical unit comprising an electrical box with fastening flanges and an air and moisture resistant cover thereon, the assembly being mounted on a structural member.
Figure 2:
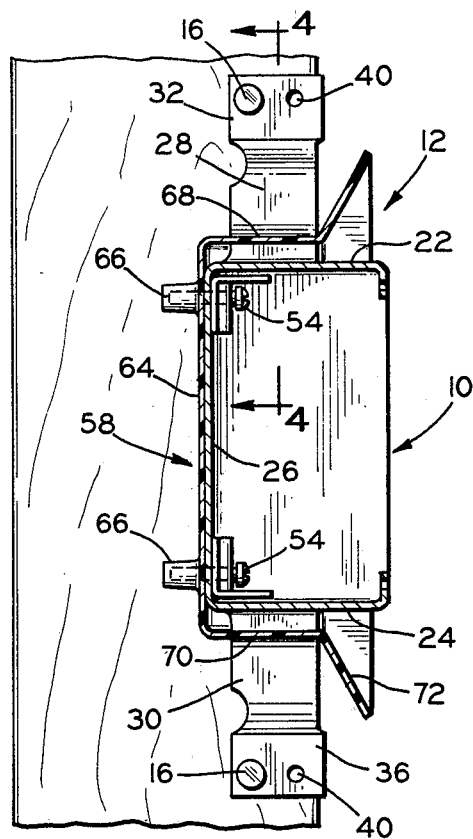
FIG. 2 is a view in vertical cross section taken centrally through the box and the cover of FIG. 1.
Figure 4:
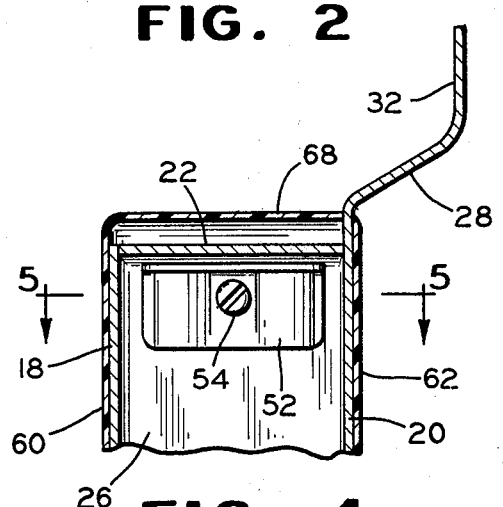
FIG. 4 is a fragmentary view in cross section taken along the line 4—4 of FIG. 2.
Figure 5:
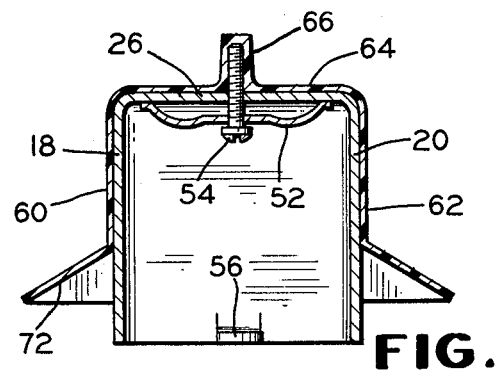
FIG. 5 is a view in horizontal cross section taken along the line 5—5 of FIG. 4.

Referring particularly to FIGS. 1 and 2, an electrical box 10 is shown with a cover 12 and is affixed to a stud or other structural member 14 by nails 16 or other suitable fasteners, such as screws. The electrical box 10 can be sectional but, as shown, is made of one piece of metal and includes sidewalls 18-24 which are structurally integral with and bent from the plane of a back wall 26. Upper and lower fastening flanges 28 and 30 extend outwardly from the electrical box 10 and, as shown, are structurally integral with and extend from upper and lower edges of the side wall 20, as best depicted in FIG. 4. The upper fastening flange 28 has mutually perpendicular fastening flanges 32 and 34 with the lower fastening flange 30 having similar mutually perpendicular fastening flanges 36 and 38. These flanges have suitable openings 40 positioned therein to receive the fasteners 16 in order to fasten the flanges 28 and 30 to the front and/or side surfaces of the structural member 14, which is of rectangular shape in transverse cross section.

The electrical box 10 has two openings 42 (FIG. 3) in each of the upper and lower side walls 22 and 24 for receiving wires or conductors 44. The openings 42 are normally closed by knockout plugs 46 connected to the walls 22 and 24 by frangible tangs 48 and having noncircular openings 50 therein. These receive a non-circular tip portion of a tool which can be manipulated to break the frangible tangs 48 and remove the knockout plugs 46 from the openings 42 where needed or desire. The electrical box 10 also has wire clamps 52 of known configuration with concave portions aligned with the wire openings 42 and a central web therebetween through which a screw 54 or other threaded fastener extends to connect the clamp 52 to the back wall 26 of the box 10. The back wall 26 has a threaded bore to receive the screw 54 which can be turned in to clamp the wires 44 between the clamp 52 and the back wall 26 after they are in place. The box 10 also has the usual ears 56 at the open face thereof to receive an electrical outlet switch or other electrical component. Of course, wider or larger boxes can be employed for more or larger components.

The air and moisture barrier cover 12 is molded on the electrical box 10 in this instance and is handled therewith as a unit, eliminating extra storage and inventory costs and substantially eliminating extra labor otherwise involved in installing the electrical box and the cover separately. The cover 12 includes a receptacle 58 which is similar in shape to the box and includes side walls 60 and 62 and a back wall 64 which are in contiguous relationship with and affixed to corresponding walls of the box during the molding process. The back wall 64 also includes bosses 66 which are molded directly over the projecting portions of the screws 54 of the box. In the normal installation, the screws 54 are turned out to enable the wires 44 to be inserted through the opening 42 and between the back wall 26 of the box and the clamp 52, and the screws do not penetrate the bosses when turned back in to clamp the wires. However, even if the screws are turned all the way in without a wire in place, the air and moisture resistant contact is retained between the screw threads and the boss even if the screw penetrates the end of the boss.

Upper and lower side walls 68 and 70 of the receptacle 58 are spaced from the upper and lower side walls 22 and 24 of the electrical box 10 by approximately ⅛ to ⅜ inch and preferably about ¼ inch. With the spacing, a suitable tool with a non-circular shank tip can be used to penetrate the side wall 68 or 70 of the receptacle 58 and engage the non-circular opening 50 in the desired knockout plug 46. The tool can then be turned slightly to break the tang 48 and free the plug from the side wall 22 or 24 of the box 10. The freed plug 46 can then be pushed to the side of the opening 42 by the tool or completely removed by inserting the tool between the side wall 22 or 24 of the box and the side walls 68 or 70 of the cover receptacle 58. If the box 10 and the cover 12 have not yet been affixed to the structural member 14, the box and cover can be tilted and the loose plug 46 shook out of the unit.

The air and moisture resistant cover 12 also includes a slanted thin-wall flange 72 which extends outwardly from the outer edges of the four side walls 60, 62, 68, and 70 of the cover 12 and slant toward the open face of the electrical box 10. As shown best in FIG. 2, the flange 72 extends from the side walls in a plane located near a line through the front nailing flanges 34 and 38 of the fastening flanges 28 and 30. The outer, forward edges of the flange 72 terminate in a plane near a plane through the open face or forward edges of the side walls 18–24 of the box 10.

Figure 3:
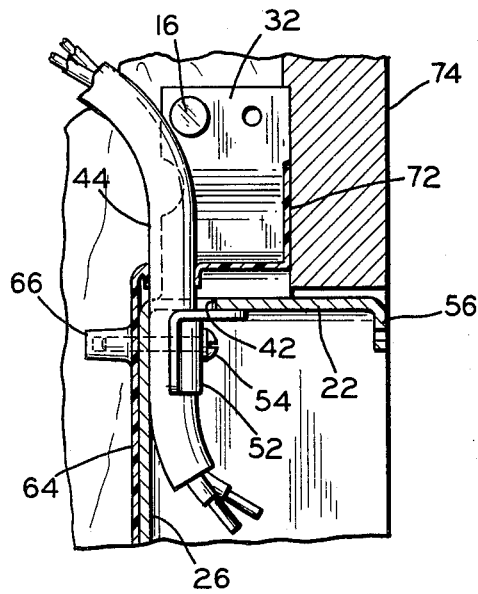
FIG. 3 is a fragmentary, enlarged view in vertical cross section of the electrical box, cover, and structural member of FIG. 2, with a wire and a wall or ceiling panel installed.

When the electrical box 10 and the cover 12 are installed as a unit, they are positioned in the desired location with respect to the stud 14 and the nails 16 are driven in suitable ones of the holes 40 in the flanges 32, 34 and 36, 38. The tool with the non-circular shank is used to penetrate the side walls 68 and 70 of the receptacle 58 to remove the appropriate knockout plugs 46. The wires are then pushed through the pilot hole formed in the cover by the tool and into the opening 42 after the screw 54 has been backed off to provide ample space between the back wall 26 of the box and the clamp 52. Since the wire 44 is larger than the pilot hole, the side wall 68 or 70 of the cover tightly engages the periphery of the wires, as shown in FIG. 3, to retain an air and moisture barrier around the box 10.

With the cover 12 also molded around the fastening flanges 28 and 30 which extend therethrough, an air and vapor barrier is also retained for the cover by the seal between the flanges and the side walls 68 and 70 of the cover. Of course, various other configurations of fastening flanges, and various other positions in which the flanges extend from the electrical box 10, can also be used in accordance with the invention. However, in all instances, the fastening flanges extend completely through the cover and can be fastened to the structural member as readily as if there were no air and moisture barrier cover around the electrical box. Further with this arrangement, there are no nails or other fasteners penetrating the cover to fasten the box to the structural member.

After the box is fastened to the stud and the wires are installed in the box, a suitable building panel 74 (FIG. 3) is affixed to the outer faces of the stud 14. The panel can be plasterboard or dry wall or can be a wooden panel or plaster. In any case, the back surface of the panel forming the wall or ceiling of the building is always in the same position, at the face of the stud 14. The outer peripheral edge of the slanted, thin-wall flange 72 of the cover 12 then is pushed back to a stressed condition with the flange 72 in tight contact with the back surface of the panel 74 to retain an air and moisture barrier around the electrical box. The outer peripheral edges of the flange 72 will be stressed more than the inner portions and will press against the back surface of the panel 74 more tightly than the inner portions. The cover also blocks air and moisture flow through a gap between the electrical box and the building panel.

When installed, the front face of the box 10 will extend approximately to the front surface of the panel 74. For thicker panels, the face may be somewhat recessed and for thinner ones may project slightly beyond the face of the panel, but never enough to interfere with the switch or outlet plate or other suitable plate applied to the face of the box and over adjacent portions of the panel.

The cover 12 is of plastic material about 0.030 inch to about 0.050 inch thick but can be much thinner. The flange is of about the same thickness or slightly thinner and is flexible so as to lay substantially flat against the back surface of the panel. The flexibility also enables the flange to deform slightly in the event of any imperfections or unevenness on the back of the panel in order to retain the air and moisture barrier therebetween. The plastic material on the cover also is preferably transparent or translucent particularly to facilitate manipulation of the knockout plugs 46.

Various modifications of the above-described embodiment of the invention will be apparent to those skilled in the art and it is to be understood that such modifications can be made without departing from the scope of the invention, if they are within the spirit and the tenor of the accompanying claims.

We claim:

1. In combination, a rigid electrical box having an open face, side walls, and a back wall oposite the open face, at least one fastening flange affixed to the box and extending outwardly from one of said side walls and back wall thereof for fastening said box to a structural member, a cover of flexible plastic material of the same general shape as said box extending around and enclosing all of said side walls and said back wall of said outlet box with the open face of said box remaining uncovered, to form an air and vapor barrier around said side walls and said back wall of said box, said cover having wall portions which are contiguous with and affixed to corresponding wall portions of said electrical box, and said cover having two other, opposite wall portions which are spaced from opposite side walls of said box, said cover having a flexible, thin-wall flange around the perimeter extending outwardly therefrom and slanting toward the open face of said box, whereby the peripheral edge of said thin-wall flange can tightly contact the back surface of a wall or the like around the open face of said box and on the same side of the wall or the like as said box, said fastening flange extending through said cover behind said thin-wall flange and sealed with respect to said cover to maintain the air and vapor barrier around said box.

2. The combination according to claim 1 characterized by said cover having side walls and a back wall and said fastening flange extending through one of said side walls of said cover.

3. The combination according to claim 1 characterized by said fastening flange having a nailing flange located beyond the periphery of said thin-wall flange.

4. The combination according to claim 1 characterized by said cover having side walls and a back wall with two opposite side walls of said cover being affixed to corresponding side walls of said box and with said back wall of said cover being affixed to said back wall of said box.

5. The combination according to claim 4 characterized by the latter opposite side walls of said box having knockout plugs therein closing off openings which receive wires.

6. The combination according to claim 4 characterized by said electrical box having threaded fasteners extending through the back wall of said box and said back wall of said cover having bosses in which the projecting portions of said threaded fasteners are received.

7. The combination according to claim 1 characterized by said cover having at least one side wall spaced from a corresponding side wall of said box, the latter side wall of said box having at least one knockout plug therein closing off an opening to receive a wire.

8. In combination, an interior building wall or the like having an opening, a front face, and a back surface, a structural member adjacent the back surface of said wall or the like, an electrical box having an open face aligned with said opening, said box having side walls and a back wall extending beyond the back surface of said wall or the like, a fastening flange extending outwardly from said box and fastened to said structural member, and a cover made of a flexible plastic material, said cover being of the same general shape as said box and receiving and enclosing the side walls and the back wall of said electrical box which project from the back surface of said wall or the like, said cover being contiguous with and affixed to said box at least at two opposite side walls thereof, and said cover having two opposite side walls which are spaced from two other opposite side walls of said box, said cover having an open face in which said box is received, said cover having a narrow, flexible, thin-wall flange extending outwardly therefrom, said flange being in a stressed condition in contact with the back surface of said wall or the like from which said electrical box projects, with the outer peripheral portions of the flexible, thin-wall flange exerting greater pressure against the back surface of the wall or the like than the inner portions of the thin-wall flange, said fastening flange extending through said cover back of said thin-wall flange and having a sealed fit to prevent any air or moisture from entering the cover around said fastening flange, and wires entering said box through said cover and tightly fitting therewith to prevent any air or moisture from entering the cover around the wires.

9. The combination according to claim 8 characterized by said structural member being of rectangular shape in transverse cross section, and said fastening flange having a first nailing flange parallel to one surface of said structural member and having a mutually perpendicular nailing flange parallel to another surface of said structural member.

10. The combination according to claim 8 characterized by the two other opposite side walls of said box having knockout plugs therein with non-circular openings to facilitate removal thereof.

11. The combination according to claim 8 characterized by said electrical box having clamps therein with threaded fasteners extending through the back wall of said box and affixing said clamps to the back wall of said box, and with said cover having a back wall contiguous with the outer surface of the back wall of said box, with said cover back wall having bosses to receive projecting portions of said threaded fasteners.

* * * * *